United States Patent [19]
Roehm et al.

[11] Patent Number: 5,781,178
[45] Date of Patent: Jul. 14, 1998

[54] WIRELESS REMOTE INPUT FOR ELECTRONIC EQUIPMENT

[75] Inventors: Steven Phillip Roehm, Waukesha; Alan Dean Blomeyer, Milwaukee; Brian Eugene Fischer, Muskego; Jeffrey Alan Kautzer, Waukesha, all of Wis.

[73] Assignee: General Electric Company, Milwaukee, Wis.

[21] Appl. No.: 582,247

[22] Filed: Jan. 3, 1996

[51] Int. Cl.[6] .............................. G09G 5/08; G06F 3/033
[52] U.S. Cl. ........................................ 345/157; 345/159
[58] Field of Search ................................ 345/157, 159, 345/160, 184; 348/734

[56] References Cited

U.S. PATENT DOCUMENTS

| | | | |
|---|---|---|---|
| 5,012,230 | 4/1991 | Yasuda | 345/160 |
| 5,670,955 | 9/1997 | Thorne, III et al. | 345/157 |
| 5,670,988 | 9/1997 | Tickle | 345/157 |

*Primary Examiner*—Jeffery Brier
*Attorney, Agent, or Firm*—Quarles & Brady

[57] ABSTRACT

A computer input device includes a non-conductive substrate with a first conductive pattern formed by a plurality of first conductive elements positioned on the substrate surface circumferentially around a circle. A second conductive pattern formed by a plurality of second conductive elements, each positioned on the surface between two first conductive elements. A contact member has a conductive surface which when manually operated by a user selectively connects one or more of the first conductive elements to one or more of the second conductive elements. The ones of the second conductive elements so connected can be detected to produce a signal indicating an angular direction in which a cursor on a computer screen.

13 Claims, 4 Drawing Sheets

5,781,178

WIRELESS REMOTE INPUT FOR ELECTRONIC EQUIPMENT

BACKGROUND OF THE INVENTION

The present invention relates to wireless remote controls; and specifically to such controls for operating medical imaging equipment like the one described in U.S. Pat. No. 4,930,145.

Many types of electronic equipment employ wireless remote controls which allow a user to operate the equipment from a distance. Televisions, video cassette recorders, and other consumer electronic products commonly use such controls. Standard remote controls are hand-held units with a plurality of push buttons corresponding to different functions of the equipment being controlled. When the user presses one of the buttons, a switch is closed which causes the control to generate a beam of infrared light. The light beam is modulated with digital information indicating the specific button that was activated by the user and thereby the function which has been selected. An infrared detector on the controlled equipment senses the beam of light and produces an electrical signal containing the digital information carried by the light beam. The digital signal is decoded to determine the function to be performed by the equipment. Such wireless remote controls allow the user to operate the electronic equipment by selecting a variety of functions from a remote position free from cabling and other physical constraints.

Similar remote controls have been used with medical imaging systems, such as fluoroscopic cardiac equipment. In these imaging systems, the patient is positioned on a table between an X-ray emitter and a detector to produce an image of the desired portion of the patient's anatomy. In fluoroscopic systems, a camera is used to produce a video signal from the X-ray image which is displayed on a monitor adjacent the patient. A physician stands near the patient and within several feet of the monitor. During a fluoroscopic examination, it is not uncommon for the physician to move about the patient. In order to permit the physician to be at a number of positions and still control the apparatus, wireless remote controls similar to those used with consumer electronic equipment have been provided to control the X-ray system.

The physician often manipulates the patient and medical implements inserted is the patient during the fluoroscopic examination. Thus, at least one hand of the physician must be free to perform the manipulation. This created problems with respect to the use of conventional remote controls that were difficult to operate with one hand due to the large number of buttons. Furthermore, some remote controls require several buttons to be pressed in sequence to activate certain functions.

As electronic equipment and medical imaging systems have become more complex, the number of functions which an operator would like to control from a remote location has increased. Thus, a need exists for a wireless remote control which can conveniently be utilized to operate a large number of functions with a single hand.

Many medical imaging systems are able to calculate the relative size of anatomical features in the video image. To do so, the physician marks the boundary of a feature using a cursor and presses a button when the cursor is properly positioned. Therefore, it also is desirable to provide an easy to use remote control for positioning a cursor to demonstrate anatomical features in the image.

SUMMARY OF THE INVENTION

A general object of the present invention in to provide an input device for a computer, such as one that controls medical imaging apparatus.

Another object is to provide such a device for inputting information designating movement along two orthogonal axes.

These and other objectives are fulfilled by an input device that includes a substrate having a surface with several conductive patterns thereon. A first conductive pattern is formed by a plurality of first conductive elements positioned on the surface around a closed plane figure, such as a circle. A second conductive pattern has a plurality of second conductive elements with each one positioned between two of the first conductive elements. The preferred embodiment provides a third conductive pattern which is formed by a plurality of third conductive elements, each positioned between one of the first conductive elements and one of the second conductive elements.

A contact member has a conductive surface, which when the contact member is manually operated by a user, selectively connects one or more of the first conductive elements to one or more of the second conductive elements. In the preferred embodiment the contact member also electrically connects at least one of the third conductive elements to some of the first and second conductive elements. For example, the contact member is a resilient button that is normally held above the substrate surface until the user presses the button causing a conductive surface on the button to contact the conductive patterns.

The number and position of the conductive elements that are electrically connected by the contact member is detected to sense the directional input being designated by the user.

DETAILED DESCRIPTION OF THE INVENTION

Figure 1:
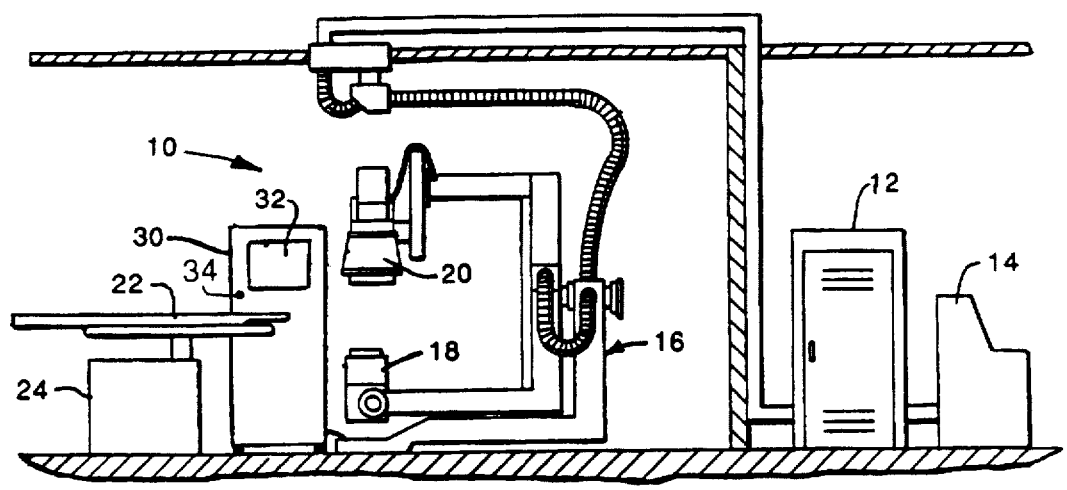
FIG. 1 is a pictorial representation of a medical imaging system incorporating the present invention.

Referring to FIG. 1, a medical imaging system 10 includes power supply 12, an operator console 14 containing control circuits, and a gantry 16 on which an X-ray tube 18 and X-ray detection assembly 20 are mounted. An X-ray transmissive table 22, for supporting a patient being examined, is positioned adjacent to the gantry 16. The table 22 is mounted on support 24 in a manner that allows the table to slide between the X-ray tube assembly 18 and the X-ray detection assembly 20.

A moveable display console 30 is located adjacent the patient table 22 and includes video monitor 32 on which a physician can view the X-ray image from the video camera within the detection assembly 20. An infrared light detector 34 is mounted adjacent to the monitor 32.

During configuration of the system for an X-ray exposure and even during many examination procedures, a technician or a physician stands adjacent the table. That person controls the system 10 utilizing a hand-held remote control unit which sends infrared light signals to the detector 34 on display console 30.

Figure 2:
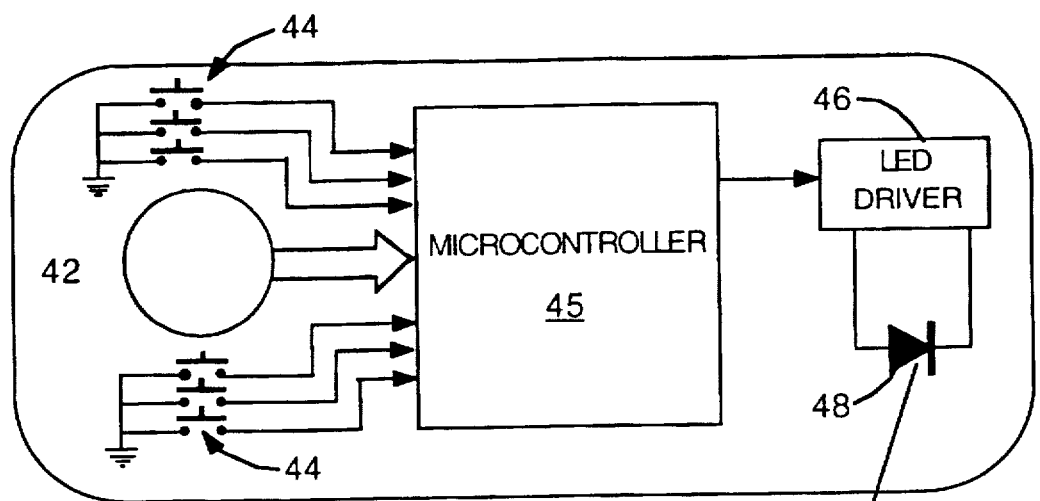
FIG. 2 is a schematic block diagram of a hand-held remote control for the imaging system.
Figure 2:
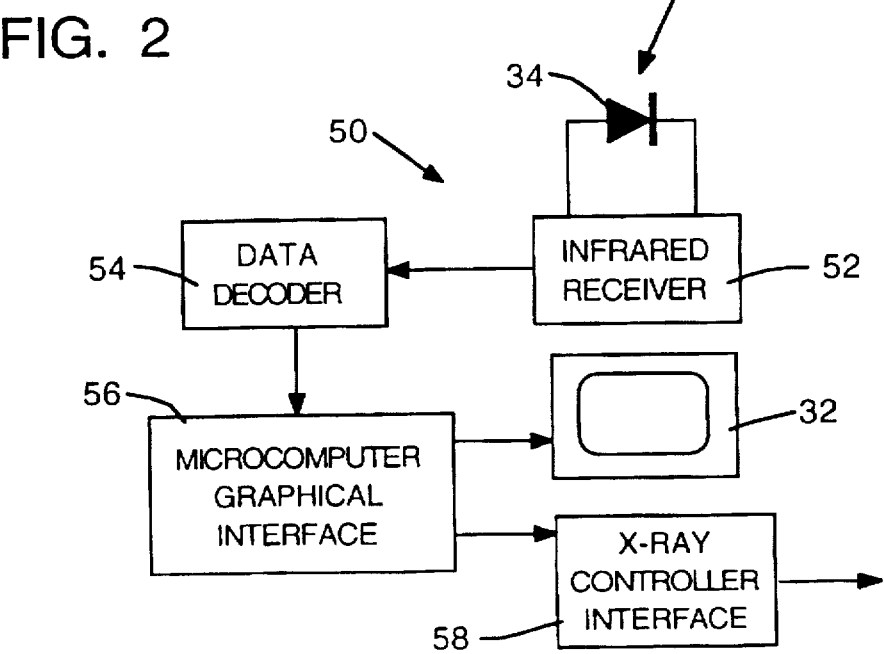

With reference to FIG. 2, the remote input system for the X-ray system 10 comprises a hand-held remote control 40 having a unidisk 42 which provides a two-axis input and a series of pushbutton switches 44. The signals produced by unidisk 42 and switches 44 are applied to inputs of a microcontroller 45, such as a model DS 2250 manufactured by Dallas Semiconductor, which responds to the input by producing a digital signal which indicates the input which has been activated. The digital signal is applied to a light emitter diode (LED) driver 46 which is connected to a light emitting diode 48 which produces a light beam 49 that is modulated with the digital signal.

The light beam 49 is received at the light detector 34 which is part of a receiver circuit 50 within the display console 34 (FIG. 1). The light detector 34 produces an electrical signal which is applied to an infrared receiver 52 that recovers the digital data signal that modulated the light beam 49. A data decoder 54 receives the recovered digital signal and produces an indication of which one of the switch inputs was activated on the hand-held remote control 40. That indication is conveyed to a microcomputer graphical interface 56 which controls the position of a cursor on the video monitor 32 and provides functional input signals to an X-ray controller interface 58 that is connected to control circuits in the operator console 14. As will be described in detail, the hand-held remote control 40 and receiver circuit 50 provide the operator with a mechanism by which the functionality of the X-ray system can be controlled.

Figure 3:
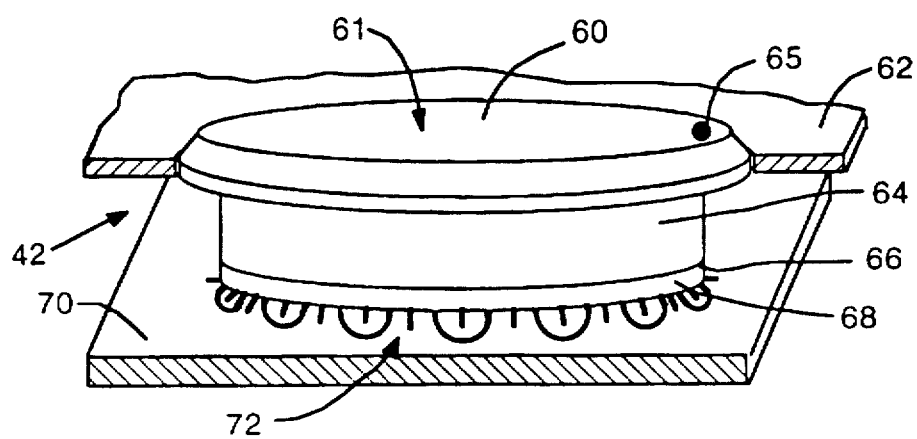
FIG. 3 is a partially cut-away isometric view of a two dimensional input device in the hand-held remote control.

One of the unique features of the hand-held remote control 40 is the unidisk 42, which functions as a two-axis input device, controlling the horizontal and vertical movement of the cursor on video monitor 32. With reference to FIG. 3, the unidisk 42 comprises a resilient button 60 which includes a disk 61 located in an aperture in the shell 62 of hand-held remote control 40 with tubular boot 64 extending from the inner surface of the disk. The bottom annular surface 66 of the tubular boot 64 has a conductive ring 68 applied thereto, forming an electrically conductive end surface on the tubular boot. For example, the disk 61 and boot 64 may be formed of silicon rubber with a conductive carbon layer or copper foil applied to the bottom annular surface 66. Conductive ring 68 faces the upper surface of a printed circuit board 70 within the hand-held remote control 40 and is spaced therefrom due to the button 60 being supported from the underside by a post (not visible).

A conductive layer 72 comprises several patterns of conductive material, such as copper, formed on the upper surface of the printed circuit board 70 underneath the unidisk button 60. As will be described, the user is able to press one side of the hard button 61 resulting in a portion of the conductive ring 68 to contact the conductive layer 72 on printed circuit board 61. This action causes the conductive ring to short together several elements of the conductive pattern, providing an electrical signal which is detected by the microcontroller 45.

Figure 4:
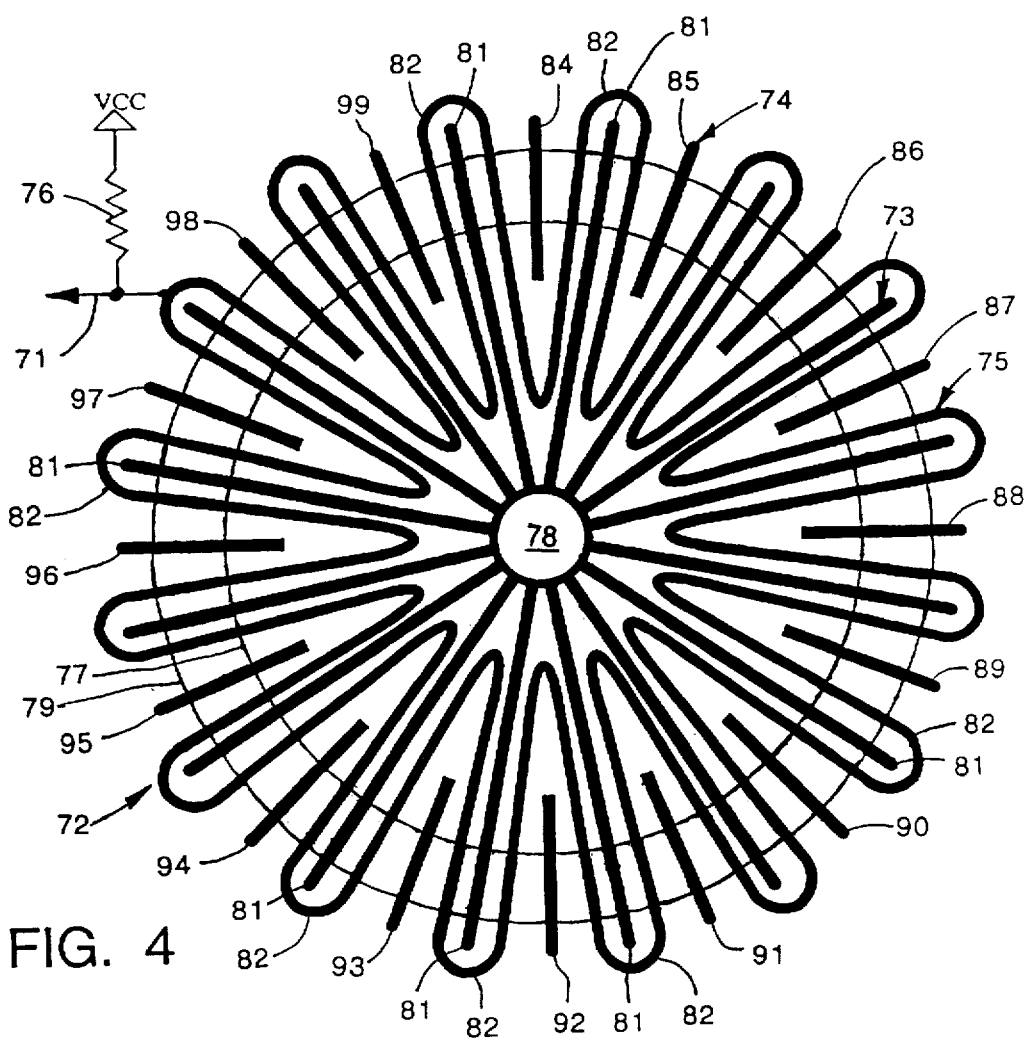
FIG. 4 illustrates conductive patterns on a printed circuit board in FIG. 3.

FIG. 4 illustrates the configuration of the conductive layer 72 beneath the unidisk button 60 which layer is formed of three component patterns: common pattern 73, directional pattern 74 and disk active pattern 75. All of theses patterns are circular and centered about a common point at which post 78 extends upward from the printed circuit board 70 to support the unidisk button 60.

The common pattern 73 consists of sixteen conductive elements 81 extending radially from the common point and connected together by a conductive ring extending around the post 78. A plated through hole in the printed circuit board connects the common pattern 73 to circuit ground. Disk active pattern 78 has a flower-like appearance due to sixteen U-shaped conductive petal-shaped loops 82 arranged in a circle and extending around the radial elements 81 of the common pattern 73. Each U-shaped loop 82 has a pair of straight elements with the straight elements of two adjacent loops that are between adjacent radial elements 81 of the common pattern being electrically connected together thus forming a continuous serpentine pattern winding around, in and out of the common pattern 73. The directional pattern 74 comprises sixteen conductive stripe elements 84–99, each of which is located between two adjacent loops 82 of the disk active pattern 73. Although the three component patterns 73, 74 and 75 of the conductive layer 72 have circular configurations, they may be laid out around another closed plane geometric figure.

Although not shown in the illustration of the conductive layer 72 in FIG. 4, each directional stripe element 84–99 is connected by a separate conductor on the surface of printed circuit board 70 to a different input line of a parallel port for microcontroller 45. Similarly, the disk active pattern 75 is coupled by a conductor on the printed circuit board 70 to another input of microcontroller 45 and by a pull-up resistor 76 to a source of positive voltage. As previously noted, the common pattern 73 is held at circuit ground.

The two circular lines 77 and 79 in FIG. 4 represent the inner and outer circumferences of the conductor ring 68 on the bottom edge of the unidisk button 60. This illustrates sections of the conductive pattern that will be contacted upon depression of the button against the printed circuit board 70.

Figure 5:
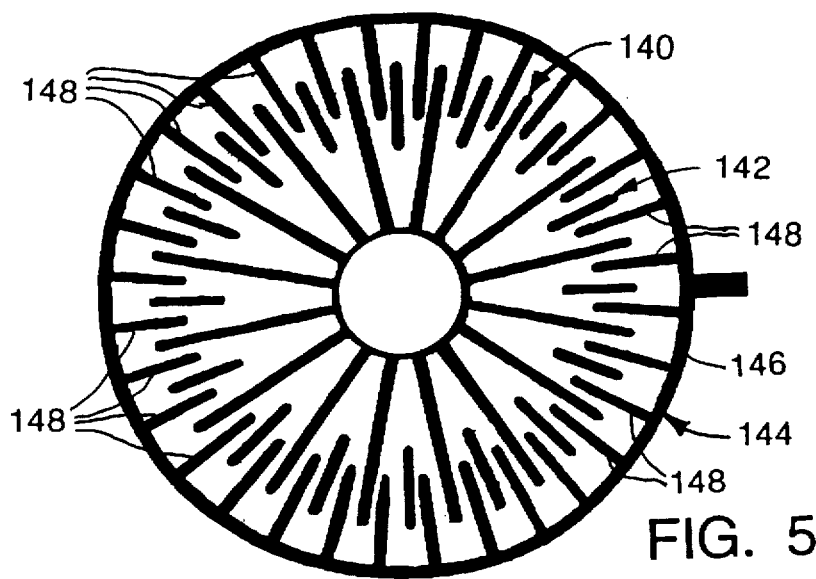
FIG. 5 illustrates alternative conductive patterns on the printed circuit board in FIG. 3.

FIG. 5 illustrates an alternative set of conductive patterns to those shown in FIG. 4. A common pattern 140 consists of sixteen conductive elements extending radially from and electrically connected together at a common point. The directional pattern 142 comprises sixteen conductive stripe elements, each of which is located between two adjacent elements of the common pattern 140. The disk active pattern 144 includes a conductive ring 146 extending around the common and directional patterns 140 and 142. Thirty-two conductors 148 project radially inward from the conductive ring 146 toward the center of the ring. Each conductor 148 extends between a conductive stripe element of the directional pattern 142 and a conductive element of the common pattern 140. All of theses patterns are circular and centered about a common point.

With reference to FIGS. 2 and 4, the unidisk 42 is activated by the user's thumb pressing a point near the perimeter of the disk 61 which corresponds to the direction along which the user desires the cursor on the video monitor screen 32 to move. This is similar to the technique used with a joystick to move the cursor. Thus if the cursor is desired to move rightward, the user presses the disk 61 downward at point 65 which causes the unidisk button 60 to tilt on top of the post 78.

As the disk button 60 tilts downward, the bottom surface of the conductive ring 68 touches the conductive layer 72 on the surface of the printed circuit board 70. Contact by the conductive ring 68 shorts together several elements of the conductive patterns 73, 74 and 75 with the exact number of elements depends upon the amount of force applied by the user and area of the disk 61 to which the force is applied. In the case of force applied at point 65 for rightward movement of the cursor, the conductive ring 68 contacts conductive stripe element 88 of the directional pattern 74, adjacent loops 82 of the disk active pattern 73, and the adjacent radial elements 81 of the common pattern 73. Because all the radial elements 81 of common pattern 73 are connected directly to ground, this shorting of the conductive elements pulls the disk active pattern 75 and the directional stripe element 88 to ground potential. The disk active pattern 75 going to ground potential signals microcontroller 45 that a depression of the unidisk 42 has occurred.

Figure 6:
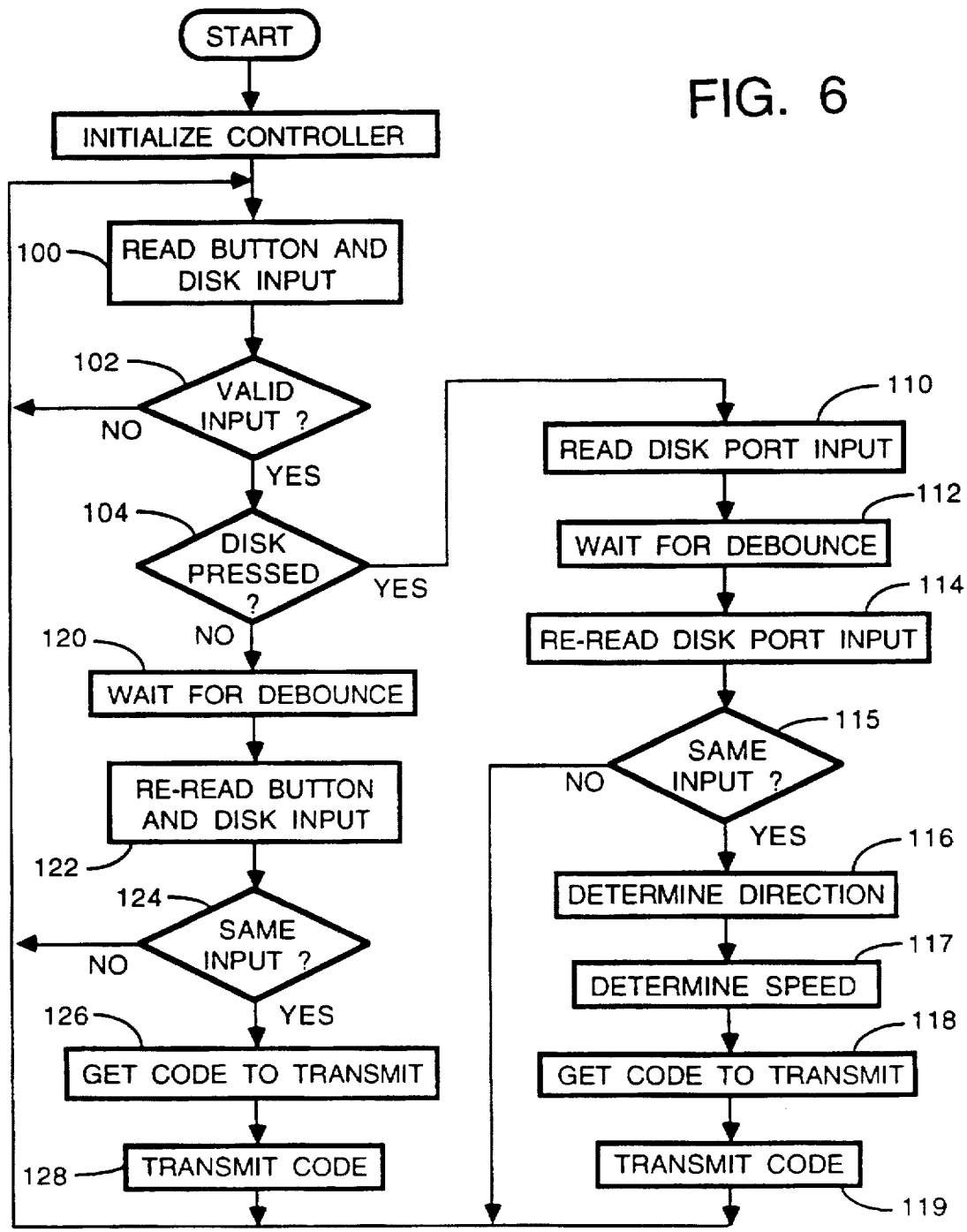
FIG. 6 is a flowchart of a software routine executed by the hand-held remote control to produce input signals for controlling the medical imaging system.

This signal is detected by the software routine, depicted in FIG. 6, which is executed by the microcontroller 45. The execution of this routine waits at step 100 for a unidisk active signal or a signal from one of the push button switches 44. Upon the receipt of one of these signals, the program execution advances to step 102 where a determination is made whether this is a valid signal. If the input is invalid the program execution returns to step 100 to await the receipt of another signal, otherwise the microcomputer 45 stores the binary input signals before advancing to step 104. Then, a determination is made whether the unidisk 42 is depressed in which case the program execution branches to step 110.

When depression of the unidisk 42 is detected at step 104, the program execution by microcontroller 45 branches to step 110. At this time, the microcontroller 45 reads the data received at the parallel input port to which the directional stripe elements 84–99 of the unidisk 42 is connected. Further execution of the routine is delayed at step 112 for a debounce period and the parallel input port is read again at step 114. The two values read from the input port are compared at step 115 to determine if they remain the same in which case execution of the unidisk processing branch continues to derive a direction and a speed value at which the cursor should be moved.

The cursor direction is determined at step 116 by detecting which one of the sixteen directional stripe elements 84–99 of the directional pattern 74 have been pulled to ground potential by contract with the conductive ring 68. If only one of the directional stripe elements 84–99 is found to be at ground potential then the direction in which to move the cursor is determined directly from a look-up table stored within the memory of microcontroller 45. That table defines a relationship between each of the directional stripe elements 84 and 99 and an angular direction along which to move the cursor, as depicted by Table 1.

TABLE 1

| ELEMENT NUMBER | DIRECTION |
| --- | --- |
| 84 | 0.0° |
| 85 | 22.5° |
| 86 | 45.0° |
| 87 | 67.5° |
| 88 | 90.0° |
| 89 | 112.5° |
| 90 | 135.0° |
| 91 | 157.5° |
| 92 | 180.0° |
| 93 | 202.5° |
| 94 | 225.0° |
| 95 | 247.5° |
| 96 | 270.0° |
| 97 | 292.5° |
| 98 | 315.0° |
| 99 | 337.5° |

Directional stripe element 84 is located at zero degrees on the directional pattern 73 and is used to designate an upward vertical movement of the cursor. Directional stripe element 92 is 180° degrees around the directional pattern from stripe element 84 and is activated to designate downward movement for the cursor. Intermediate directional stripe elements 88 and 96 correspond to right and left horizontal movement, respectively.

In the previous example where the user depressed the disk 61 at point 65 indicating a rightward movement, only conductive stripe element 88 of the direction pattern 74 was brought to ground potential with all the other ones of stripe elements 84–87 and 89–99 being held at a positive potential by pull-up resistors (not shown). The grounding of only directional stripe element 88 would occur if a relatively light pressure was exerted on the disk 61 at point 65. If a greater force is exerted by the user on the diskette point 65 the conductive strip 68 on the bottom of the button 60 will contact several conductive stripe elements 84–99 of the directional pattern 74. For example, directional stripe elements 87, 88 and 89 may be contacted by the conductive ring 68, thereby pulling those stripe elements to ground potential.

When microcontroller 45 senses that multiple directional stripe elements 87–89 are at ground potential simultaneously, the direction in which to move the cursor is derived by averaging the angular directions corresponding to each grounded stripe element. In this case, the microcontroller 45 looks up the angles corresponding to directional stripe elements 87–89 in the memory table, finding the corresponding angles of 67.5°, 90° and 112.5° for directional stripe elements 87, 88 and 89 respectively, as shown in Table 1. The microcontroller then computes the arithmetic average of those three angular directions producing a result of 90°. It will become apparent that the present unidisk has an angular resolution of 11.25°. For example when the unidisk button 60 grounds only stripe elements 84 and 85 of the directional pattern 74, the microcomputer calculates the average of the corresponding angular directions 0° and 22.5°, which equals 11.25°.

The microcontroller 45 also determine a speed at which to move the cursor in the designated direction based on the input signals from the unidisk 42. That speed is determined by counting the number of directional stripe elements 84–99 which have been grounded with the greater number corresponding to a faster speed. Thus in the previous examples, if only directional stripe element 88 is grounded by operation of the unidisk button 60, the cursor would be moved in the 90° direction at a relatively slow velocity, whereas if three directional stripe elements 87–89 were grounded the cursor would be moved in the same direction at a significantly greater velocity. Therefore the location and the magnitude of the force that the user exerts on the unidisk 42 is employed by the microcontroller to determine the direction and speed at which to move the cursor on the video monitor 32.

Once the direction and speed for the cursor have been derived, the program execution advances to step 118 where the microcontroller 45 accesses a table within its memory to obtain digital codes which indicate the angular direction and speed. The microcontroller then formulates a digital message word comprising a sequence of digital ones and zeroes to formulate a signal that is applied to the LED driver 46. This word contains an initial pulse sequence that indicates the start of a new transmission word which is then followed by the digital sequence for the direction and speed.

Any conventional digital data encoding technique used in hand-held remote appliance controls may be utilized to encode the data for transmission. For example, a standard pulse position modulation (PPM) technique can be utilized wherein the signal is comprised of pulses of a high frequency signal. For example, each pulse consist of a burst of a 40 kHz signal for 600 microseconds. In the PPM transmission technique, the time interval between leading edges of consecutive pulses are used to represent different digital values. For example a binary value of zero is represented by an interval of 1.8 milliseconds between consecutive pulses and a binary value of one is represented by a 1.2 millisecond interval. A time interval between consecutive pulses of 3.6 milliseconds designates the beginning of a new transmission word. The PPM technique allows the use of a narrow band receiver 52 which provides increased noise immunity, as compared to the use of non-modulated pulses and a wide band receiver.

The digital signal word is sent from the microcontroller 45 to the LED driver 46 at step 119 causing LED 48 to produce a light beam 49 which is modulated with the encoded direction and speed information. As previously described, the light beam is detected by receiver 50 which decodes the digital word to determine the direction and speed at which to move the cursor on the monitor 32 of the X-ray system 10.

Alternatively, when the microcontroller 45 detects activation of a push button switch on the hand-held remote control, the program execution branches to step 120. At the time, further execution is delayed for a debounce interval and thereafter the input port is read again at step 122. The signal from the input port is compared at step 122 with the signal read at step 100 to determine if the same input line remains active, i.e. the same push button switch remains depressed. Unless a given input remains active for the debounce period, the input activation is considered spurious and the routine returns to step 100.

If that is not the case, the program execution advances to step 126 where the digital code identifying closed push button switch is obtained from a look-up table within the microcontroller memory. That code then is incorporated into a digital signal word for transmission by the remote control 40. At step 128, that digital signal word is sent from the microcontroller to the LED driver 46 which results in the production of a light beam 49 that is modulated with the digital code indicating the push button switch that was depressed. As previously described the light beam 49 is detected by receiver 50 which decodes the digital word to determine that push button and hence the function that the user desires to be performed by the X-ray system 10.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. For example, the present input device has application with other types of medical imaging systems and with electronic apparatus in general. Accordingly, the scope of the invention should be determined from the following claims and not limited by the above disclosure.

We claim:

1. A computer input device comprising:
    a substrate having a surface;
    a first electrically conductive pattern formed by a plurality of first conductive elements positioned on the surface around a closed figure;
    a second electrically conductive pattern on the surface and having a plurality of second conductive elements with each second conductive element positioned between two first conductive elements;
    a third electrically conductive pattern on the surface of the substrate and formed by a plurality of third conductive elements each of which is positioned between one of the first conductive elements and one of the second conductive elements; and
    a contact member having an electrically conductive surface which when manually operated by a user selectively connects one or more of the first conductive elements to one or more of the second conductive elements and to one or more of the third conductive elements.

2. The computer input device as recited in claim 1 further comprising means for applying a fixed voltage to the first electrically conductive pattern.

3. The computer input device as recited in claim 1 wherein the closed geometric figure is a circle.

4. The computer input device as recited in claim 3 wherein the first conductive elements extend radially from a center of the circle and are electrically connected at a central portion of the circle.

5. The computer input device as recited in claim 4 wherein the third electrically conductive pattern has a continuous serpentine shape with loops into which the first conductive elements extend and between which loops the second conductive elements are located.

6. The computer input device as recited in claim 1 wherein the conductive surface of the contact member is annular and substantially coaxial with a center of the closed geometric figure.

7. The computer input device as recited in claim 1 further comprising:
    a logic circuit connected to the plurality of second conductive means for determining which second conductive means are connected by the contact member to the first electrically conductive pattern; and
    a direction determiner which responds to the logic circuit by deriving an angle based on which ones of the second conductive elements are connected to the first electrically conductive pattern.

8. The computer input device as recited in claim 7 wherein the direction determiner stores a predetermined angle value for each of the second conductive elements and derives the angle by averaging angle values for the second conductive elements which are connected to the first electrically conductive pattern.

9. The computer input device as recited in claim 7 further comprising a velocity determiner which produces a speed value in response to how many of the second conductive elements which are connected to the first electrically conductive pattern.

10. An computer input device comprising:
    a substrate having a surface;
    a first electrically conductive pattern on the surface and having a plurality of first conductive elements extending along radii from a center point on the surface;
    a second electrically conductive pattern on the surface and having a plurality of second conductive elements arranged in a circle with each second conductive element positioned between two adjacent first conductive elements;
    a third electrically conductive pattern on the surface of the substrate and formed by a plurality of third conductive elements with each one positioned between one of the first conductive elements and one of the second conductive elements; and
    a contact member having an electrically conductive surface which selectively connects one or more of the first conductive elements to one or more of the second conductive elements upon the contact member being operated by a user.

11. The computer input device as recited in claim 10 herein the third electrically conductive pattern has a continuous serpentine shape with loops into which the first conductive elements extend and between which loops the second conductive elements are located.

12. The computer input device as recited in claim 10 wherein the conductive surface of the contact member is annular and substantially coaxial with the center point.

13. The computer input device as recited in claim 10 wherein the contact member is formed of resilient material.

* * * * *